United States Patent [19]

Flaugher

[11] Patent Number: 4,623,056
[45] Date of Patent: Nov. 18, 1986

[54] APPARATUS FOR DISTRIBUTING MATERIAL FLOW

[75] Inventor: Ronald R. Flaugher, Ludington, Mich.

[73] Assignee: The Dow Chemical Company, Midland, Mich.

[21] Appl. No.: 841,006

[22] Filed: Mar. 14, 1986

Related U.S. Application Data

[63] Continuation of Ser. No. 537,603, Sep. 30, 1983, abandoned.

[51] Int. Cl.[4] .............................................. B65G 11/00
[52] U.S. Cl. ........................................................ 193/23
[58] Field of Search .............................. 193/14, 23, 29; 406/182

[56] References Cited

U.S. PATENT DOCUMENTS

| | | | |
|---|---|---|---|
| 352,583 | 11/1886 | Spencer | 193/23 |
| 481,080 | 8/1892 | Thompson | 193/23 |
| 647,749 | 4/1900 | Hall | 193/23 |
| 716,087 | 12/1902 | Nicolay | 193/23 |
| 1,021,766 | 4/1912 | Ferguson | 193/23 |
| 1,743,939 | 1/1930 | Thomas . | |
| 2,434,435 | 1/1945 | Reibel | 193/23 |
| 2,531,526 | 11/1950 | Patterson . | |
| 2,583,488 | 1/1952 | Le Roy | 193/23 |
| 2,732,052 | 1/1956 | Campbell et al. . | |
| 2,756,859 | 7/1956 | Steffan et al. . | |
| 2,839,171 | 6/1958 | Ponto . | |
| 3,255,857 | 6/1966 | Armstrong et al. . | |
| 3,536,098 | 10/1970 | Cunningham | 406/182 |
| 3,557,924 | 1/1971 | Schlagel . | |
| 3,762,525 | 10/1973 | Loveall, Jr. et al. . | |
| 3,827,578 | 8/1974 | Hough . | |
| 4,347,922 | 9/1982 | Curry et al. . | |

FOREIGN PATENT DOCUMENTS

| | | | |
|---|---|---|---|
| 930665 | 10/1970 | Canada | 193/23 |
| 459061 | 8/1968 | Switzerland | 406/182 |
| 143719 | 3/1961 | U.S.S.R. | 406/182 |

Primary Examiner—Joseph F. Peters, Jr.
Assistant Examiner—Mary Beth O. Jones
Attorney, Agent, or Firm—J. R. Prieto

[57] ABSTRACT

An apparatus for distributing material flow having a distribution chamber defined by an upper receiving section and a lower discharge section integral therewith. The lower section is defined by a plurality of fixed downspouts arranged in a circle and communicating with each other at a portion of their upper end to form a cone with a common apex extending slightly into the receiving section at the central axis. A rotatable chute is positioned axially within the chamber to selectively distribute material flow to any one of the fixed downspouts.

10 Claims, 10 Drawing Figures

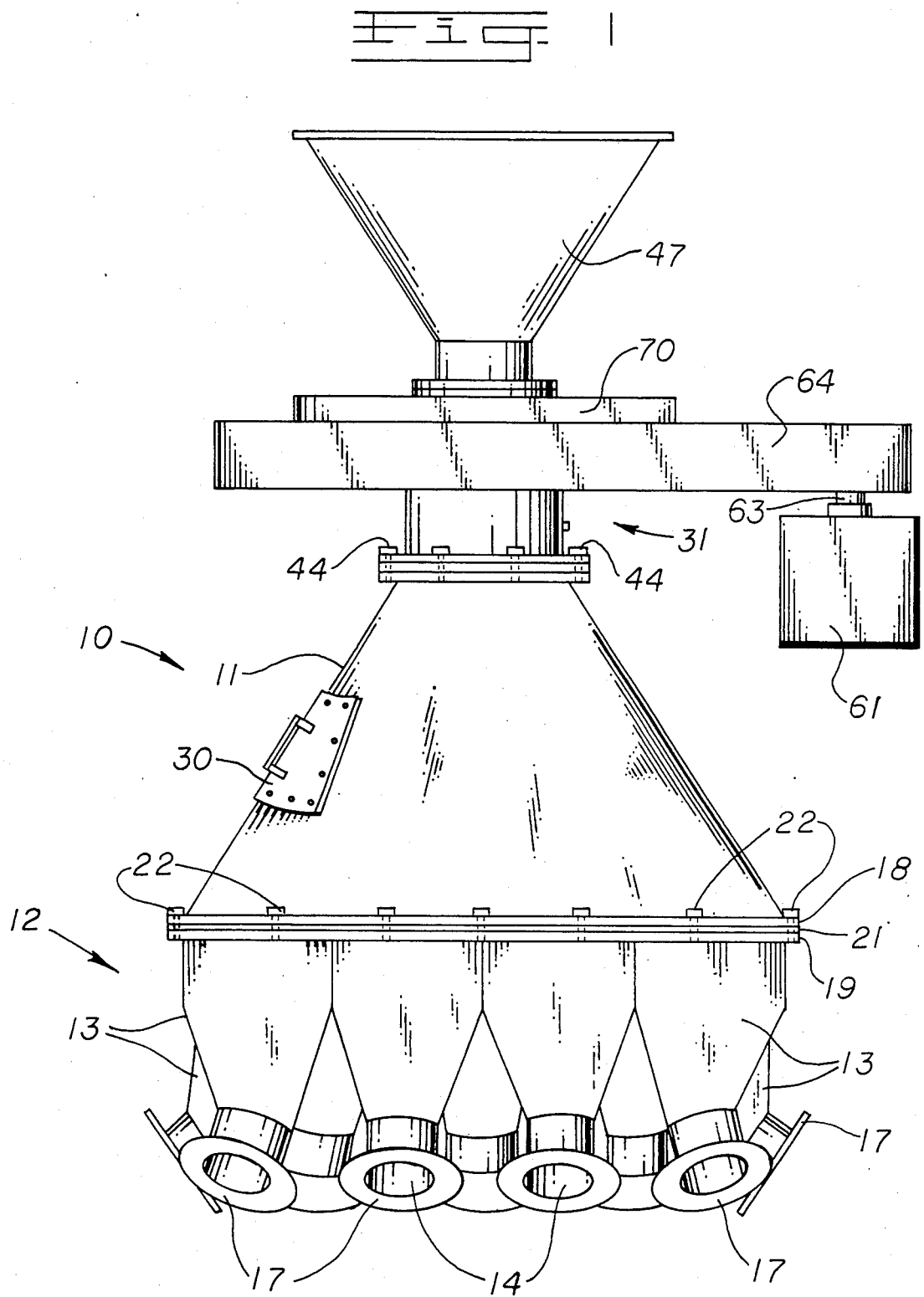

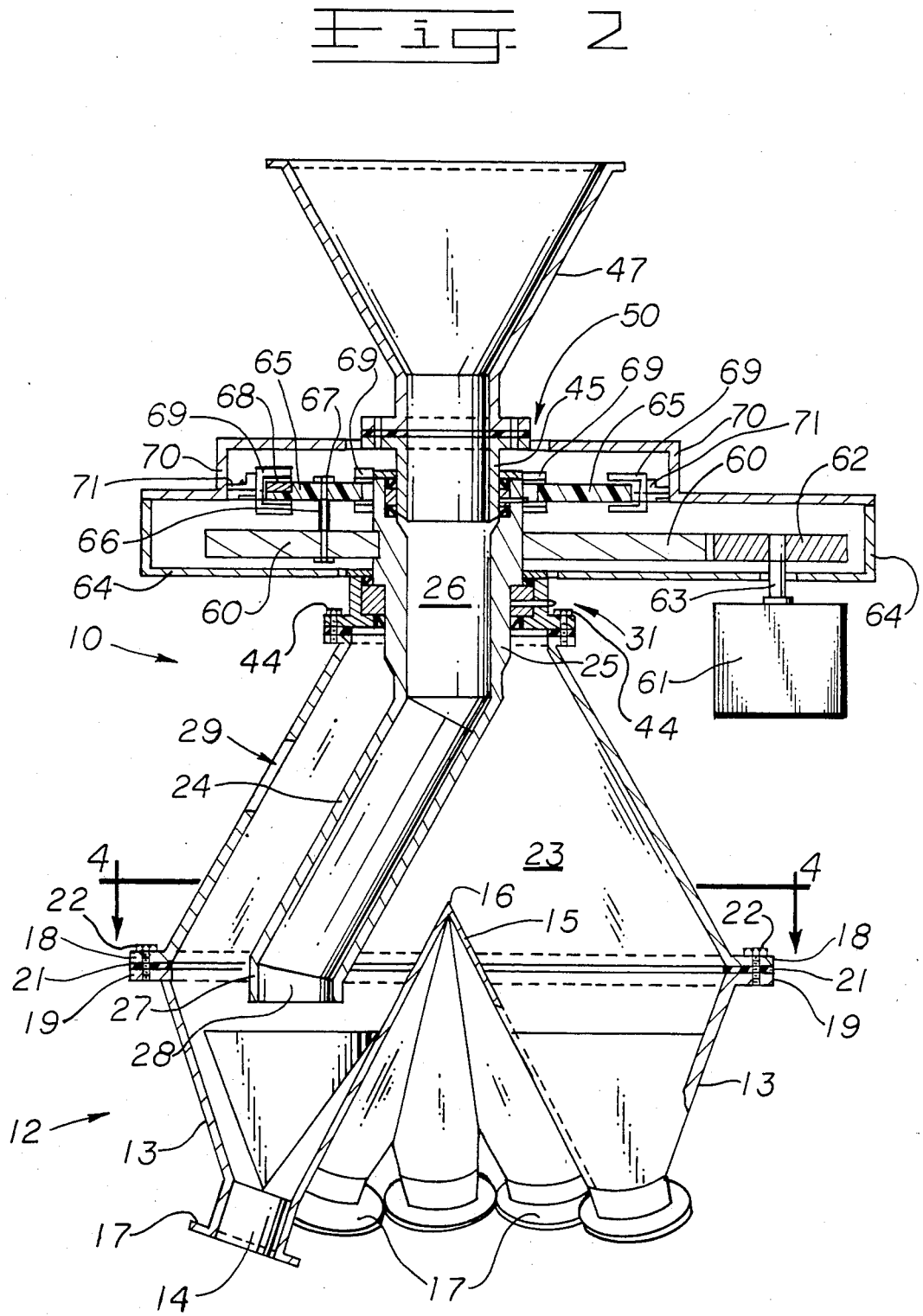

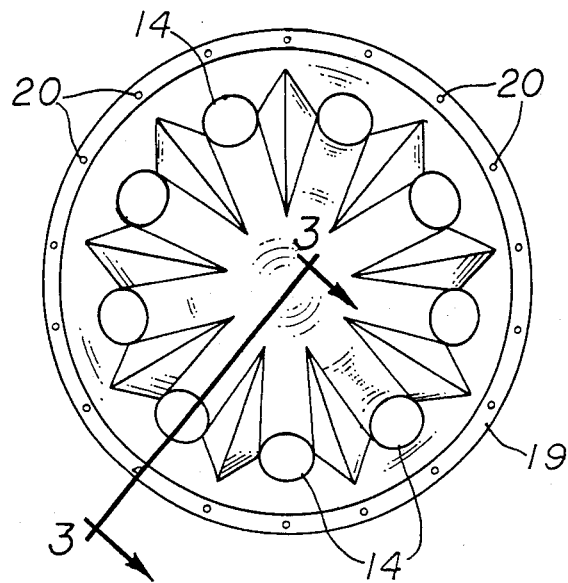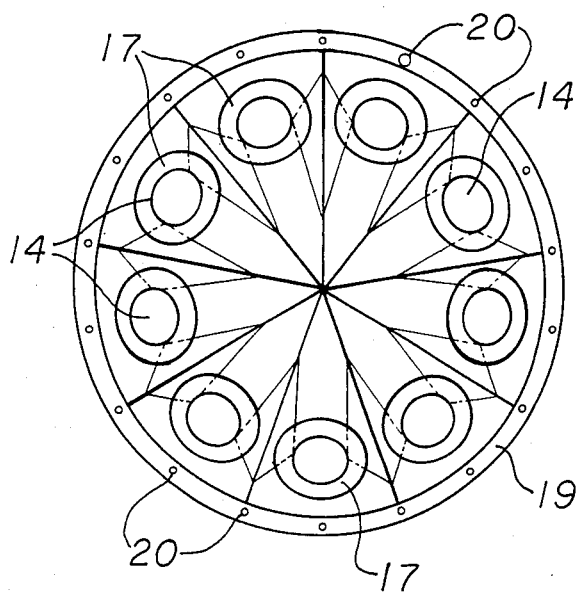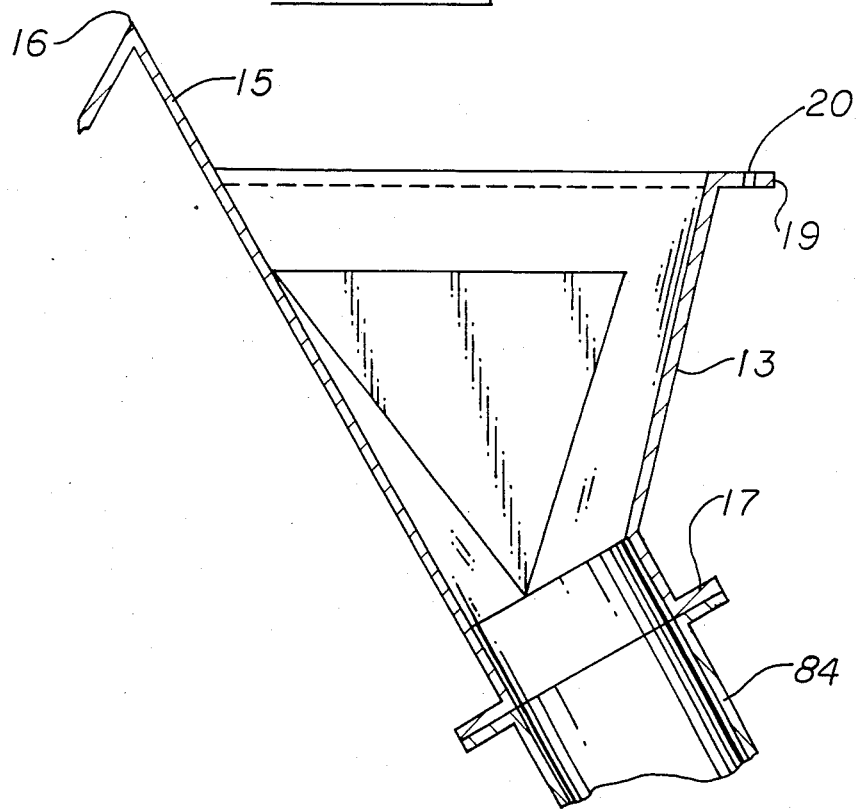

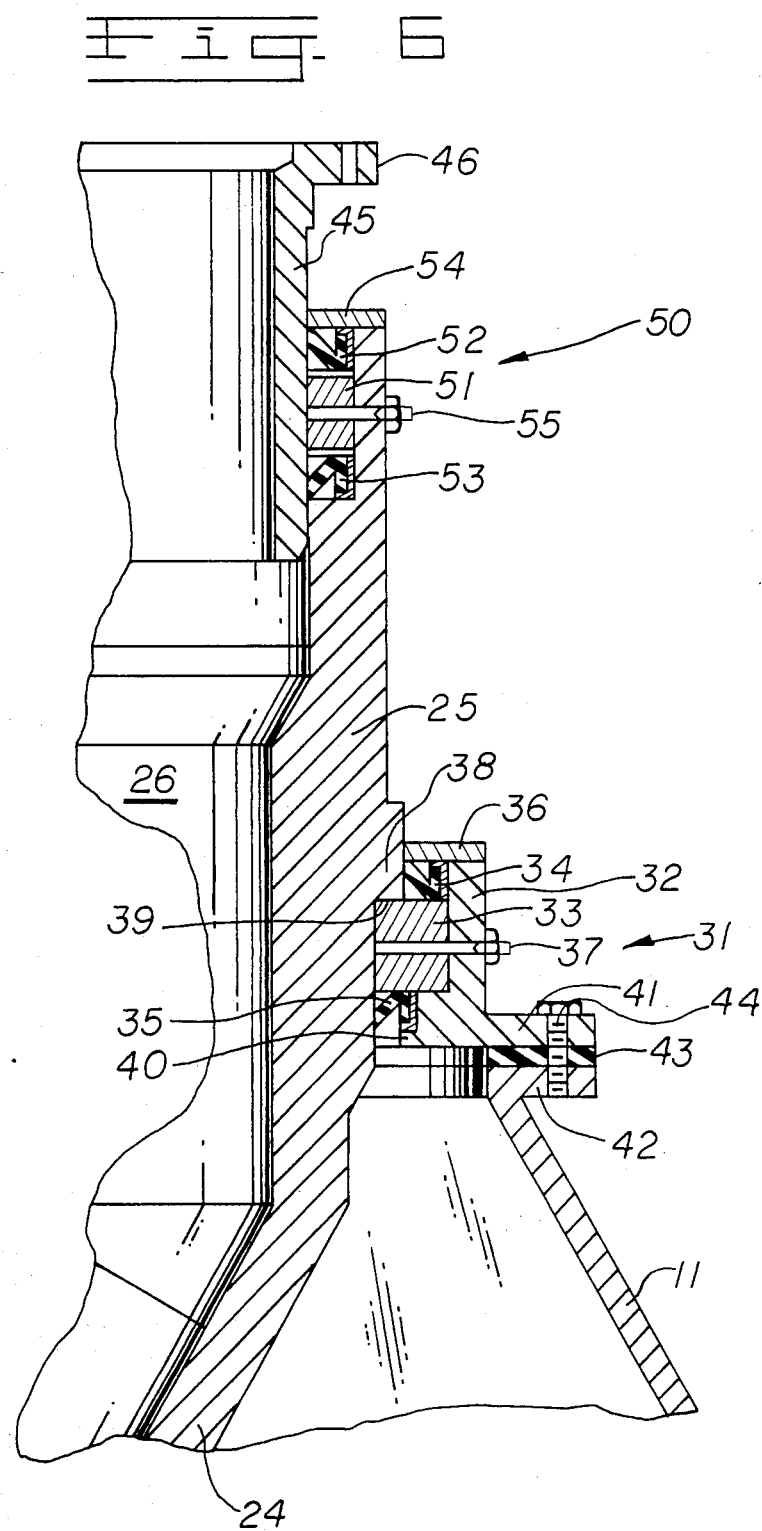

APPARATUS FOR DISTRIBUTING MATERIAL FLOW

This is a continuation, of application Ser. No. 537,603 filed Sept. 30, 1983, now abandoned.

BACKGROUND OF THE INVENTION

This invention relates to an apparatus for distributing material flow from one supply source to any of a plurality of different available directions and more particularly, the invention relates to an apparatus containing a rotatable chute for distributing material flow from one supply source to a plurality of spouts which may be connected to pipes, tanks, bins, conveyors, or the like.

Distribution devices for grain and other similar solid granular material are well known. For example, U.S. Pat. No. 2,839,171 describes a device for distributing granular and pulverant materials to a plurality of storage bins or other various storage apparatuses. The device has an upper and lower housing section. The device contains a rotatable distributing spout within the upper housing section with a plurality of upstanding open-ended bin-conduit-receiving funnels clustered in a semi-annular arrangement in the lower housing section.

U.S. Pat. No. 4,347,922 describes a distribution assembly for a grain elevator. This distributor comprises a hexagonal shaped manifold plate having a plurality of discharge openings spaced in a circle about a central axis with corresponding downspout connections. The manifold plate is covered with a pyramidal shaped housing. Within the housing is a distributor elbow for selectively distributing material into the discharge openings.

The above distributing devices are illustrative of the type of distributing devices used in grain elevators. Other similar devices are described in U.S. Pat. Nos. 352,583; 647,749; 716,087; 1,743,939; 2,434,435; 2,531,526; 2,732,052; 2,756,859; 3,255,857; 3,557,924; 3,762,525; and 3,827,578.

The above devices and other devices for distributing grain or other non-hygroscopic material are generally open to atmospheric moisture and, thus, are unsatisfactory for distributing hygroscopic material, i.e., a material or substance that has the property of absorbing moisture from the air, such as calcium chloride. Hygroscopic materials such as calcium chloride, magnesium chloride and calcium sulfate, exposed to moisture tend to form calcareous-like deposits on surfaces of equipment handling the material. Distributing devices having two members secured together in a moving relationship with each other at a line of junction and where the members are in contact with hygroscopic material flow will seize if the hygroscopic material is allowed to come in contact with moisture.

Furthermore, in distributing devices having horizontal surfaces in contact with hygroscopic material, the material tends to accumulate and buildup on these surfaces and eventually, the material flow within the confines of the distribution system is severly restricted. Even in distributing devices, such as those described above, dust buildup on internal flat areas, lips or ledges can obstruct material flow within the system during handling of non-hygroscopic materials.

There is a need for a device for distributing material flow which contains no lips, ledges or movable members in contact with the material flow, in particular the flow of hygroscopic material. The device should also be completely sealed from contact with air, moisture and dust.

SUMMARY OF THE INVENTION

The present invention is an apparatus for distributing material flow comprising a distribution chamber having a receiving section and a lower discharge section integral therewith. The discharge section is defined by a plurality of fixed spouts arranged in a generally circular fashion at a radius around a central vertical axis. The spouts communicate with each other at a portion of their upper end to form a cone with a common apex terminating inside the receiving section at the central axis. Within the distribution chamber, a chute having a receiving end with an inlet and a discharge end with an outlet is positioned axially and rotatably about the central vertical axis. The chute extends through the receiving section such that the discharge end terminates inside the discharge section at a point below the common apex. A drive means engages the upper end of the chute and is adapted to rotate the chute such that the discharge end of the chute moves in a pattern around the common apex and over the fixed spouts. Material passed into the chute is discharged into at least one fixed spout.

BRIEF DESCRIPTION OF THE DRAWINGS

FIG. 1 is a front view of the distributing apparatus of the present invention.

FIG. 2 is a front view mostly in section, of the distributing apparatus of the present invention.

FIG. 3 is a view of the distributing apparatus taken along line 3—3 of FIG. 4, which illustrates one of the fixed spouts of the apparatus.

FIG. 4 is a top view of the distributing apparatus taken along line 4—4 of FIG. 2, which illustrates a plurality of spout discharge openings in the discharge section.

FIG. 5 is a bottom view of the distributing apparatus of the present invention.

FIG. 6 is a fragmentary view, in section, of the distributing chute's upper end, which shows in detail the sealing means of the upper end of the distributing apparatus of the present invention.

DETAILED DESCRIPTION OF THE PREFERRED EMBODIMENT

Figure 8:
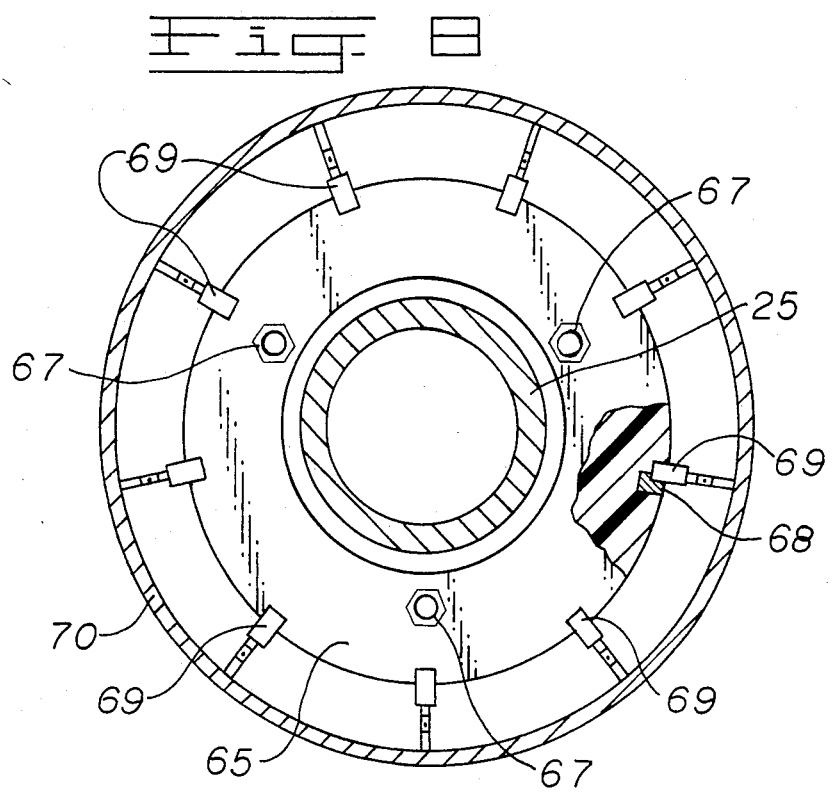
FIG. 8 is a view of the distributing apparatus taken along line 8—8 of FIG. 7, which illustrates the limit switches of the distributing apparatus and the disc carrying the magnetic flag.

Referring to FIGS. 1-5, a distributing apparatus generally indicated as numeral 10 has an upper receiving housing section 11, which in the present embodiment is of frusto-conical shape, and a lower discharge housing section 12 defined by a plurality of fixed spouts 13, hereinafter referred to as downspouts 13. The fixed downspouts 13, better illustrated in FIGS. 3-5, are, in this embodiment, funnel-like in shape and contain discharge openings 14 arranged in a generally circular fashion around a central axis. The downspouts 13 are connected to each other at a portion of their upper end to form the cone structure 15 with a common apex 16 which is, preferably, at the same point as the central axis. The apex 16 of cone 15 preferably terminates slightly inside the upper receiving housing section 11. The lower end of downspouts 13 in this embodiment are provided with flanges 17 for connecting the downspouts, i.e., by bolting, welding or the like, to a pipe, storage bins, tank, hoppers or the like. In FIG. 3 there is shown a downspout 13, in section, connected to a pipe 84 at the flange 17.

The upper receiving housing section 11 can be any shape desired, for example, pyrimidal, cylindrical or conical. In this embodiment section 11 has the shape of a frustum of a cone. The upper receiving section 11 preferably has an integral annular flange 18 at its lower end and the discharge section 12 preferably has an integral annular flange 19 at its upper end. The outer rim of the flanges 18 and 19 are provided with a series of registering holes 20 and when assembled, there is also provided a suitable sealing gasket 21 likewise having holes registering with holes 20, positioned between flanges 18 and 19. The receiving section 11 is connected or attached to the discharge section 12 in sealing relationship, preferably by means of bolts 22. The gasket 21 used between sections 11 and 12 is preferably made of a material inert to the product being distributed. The material of gasket 21, is preferably corrosion resistant and should provide an air, moisture, and dust tight seal. Examples of gasket materials which may be employed are rubbers such as neoprene rubbers, styrene-butadiene rubbers, nitrile rubbers, silicone rubbers and fluoroelastomers such as Viton ®. Other suitable means can be used to connect or attach sections 11 and 12 together to provide a seal, such as welding. Connection of the section 11 to section 12 by whatever means desired, provides a distribution chamber 23. Optionally, the receiving section 11 can contain an opening 29 with a removable cover 30. This provides a means for routine inspection maintenance, or the like of the distribution chamber 23 after sections 11 and 12 are attached together.

Within the distribution chamber 23 there is rotatably positioned a distribution chute 24 having an upper receiving end 25, extending beyond the apex of the frustoconical structure of receiving section 11, with an inlet 26 and a lower discharge end 27 with an outlet 28 for discharging material flow into the discharge openings 14 of the fixed downspouts 13. The chute 24 extends through the receiving section 11 generally conforming to the upwardly and inwardly tapering of the receiving section 11, such that the discharge end 27 terminates inside the discharge section 12 at a point slightly below the common apex 16 of cone 15.

Referring to FIG. 6, the distribution chute 24 is supported vertically and horizontally by a lower seal assembly, generally indicated as numeral 31. The lower seal assembly 31 is positioned at the apex of the frustoconical structure of receiving section 11 to provide a moisture, air and dust tight seal for distribution chamber 23. The lower seal assembly 31 preferably comprises a flanged bushing carrier housing 32 arranged concentrically and exteriorly around the upper end 25 of chute 24, a bushing 33 within the bushing carrier housing 32 and concentrically and exteriorly around the upper end 25 of chute 24, seals 34 and 35 positioned above and below the bushing 33 within the bushing carrier housing 32 and concentrically and exteriorly around the upper end 25 of chute 24, and a seal retainer 36 above the bushing carrier housing 32 and concentrically and exteriorly around the upper end 25 of chute 24. The bushing carrier housing 32 contains a fitting 37 for adding a lubricant to the bushing 33. The bushing 33 may be made of any bearing material known in the art. Preferably, a metal alloy such as phosphor bronze, or nickel bronze is used. The seals 34 and 35 are grease lip type seals commercially available from Garlock Incorporated, Industrial Packing, Palmyra, N.Y. The seals 34 and 35 are all made of material known in the art, for example, nitrile rubbers, silicone rubbers, fluoroelastomers like Viton ®, fluorocarbon polymers like Teflon ® and acrylic resins.

The upper end 25 of chute 24 contains an annular rib portion 38 which contacts the bushing 33 at the interface 39. The lower seal 35 sits on a shoulder 40 of bushing housing 32. The bushing housing 32 is preferably provided with an annular flange 41 and the upper end of the receiving section 11 is preferably provided, with an annular flange 42. The upper end of receiving section 11 and the bushing housing 32 are connected or attached by means of bolting with bolts 44. A gasket 43 is positioned between flanges 41 and 42, to provide a moisture, air and dust tight seal after bolting. The material of gasket 43 can be the same as gasket 21. The lower seal assembly 31 should prevent moisture, air and dust from entering the distribution chamber 23 and still allow the chute 24 to rotate radially when the distributing apparatus 10 is handling flow of hygroscopic material.

The upper end 25 of the distributing chute 24 is telescoped over an inlet tube 45 which is arranged coaxially with the central axis and positioned to extend beyond the top of the upper end 25 of the distributing chute 24. With reference to FIG. 6, the inlet tube 45 is in contact with an upper seal assembly generally indicated as numeral 50. The upper seal assembly 50 provides a moisture, air and dust tight seal between the inlet tube 45 and the upper end 25 of distributing chute 24. The upper seal assembly 50 preferably comprises a bushing 51 concentrically and exteriorly around the inlet tube 45 and within the telescoped section of the upper end 25 of chute 24, seals 52 and 53 positioned above and below the bushing 51 concentrically and exteriorly around the inlet tube 45 and within the telescoped section of the upper end 25 of chute 24, and seal retainer 54 above the top of the upper end 25 of chute 24 concentrically and exteriorly about the inlet tube 45. The upper end 25 of chute 24 contains a fitting 55 adjacent bushing 51 for adding a lubricant to bushing 51. The bushing 51 may be of the same material as bushing 33 and the seals 52 and 53 may be of the same material as seals 34 and 35. The upper seal assembly 50 should prevent moisture, air and dust from entering the chute 24 and still allows the chute 24 to rotate radially when the distributing apparatus 10 is handling flow of hygroscopic material.

Figure 9:
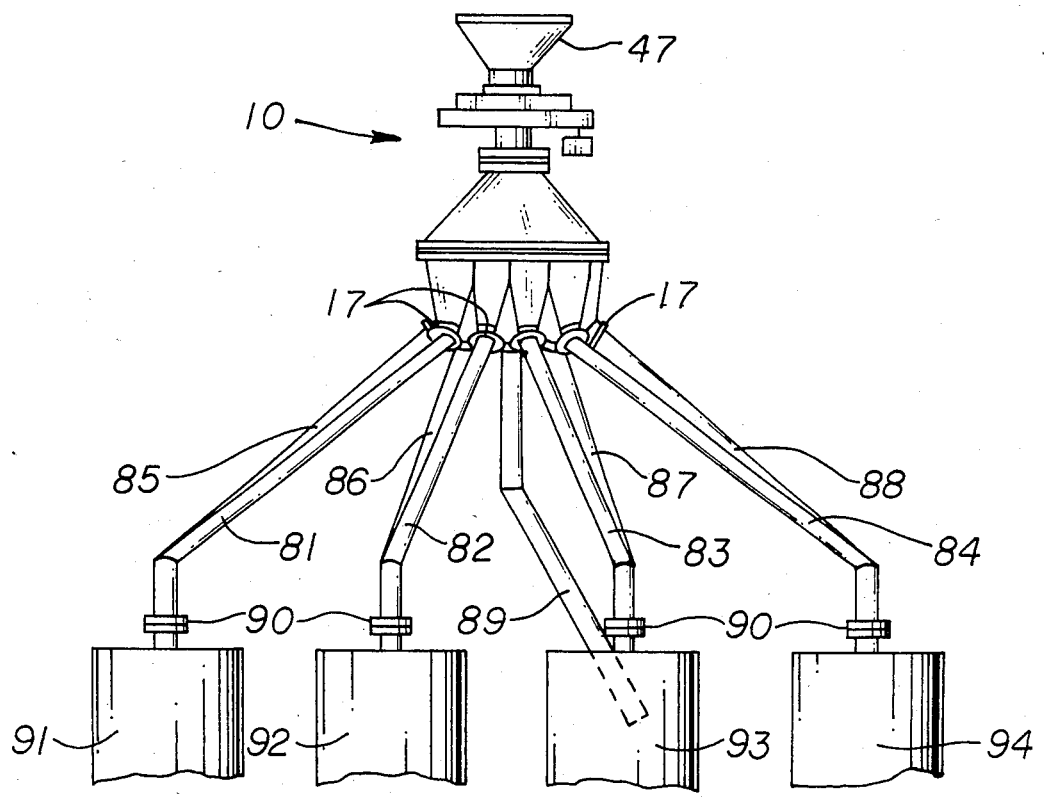
FIG. 9 is a schematic illustration which shows the distributing apparatus as it appears when connected to several storage bins.

It is preferred that the inlet tube 45 be in a fixed position to an apparatus means, which in turn is attached to a supply source, for flowing material (not shown) through the inlet tube 45 to the distributing chute 24 for distribution. In this embodiment the inlet tube 45 preferably contains a flange 46 to provide a means for connecting or attaching the inlet tube 45 to a pipe or hopper or the like for accepting material flow from a supply source. In FIGS. 1, 2, and 9 there is shown a hopper 47 connected to the inlet tube 45. The inlet tube 45 preferably slides up and down within the upper end 25 of the distributing chute 24. This will allow inlet tube 45 to move in a vertical direction a distance associated with expansion of equipment due to temperature during operation of the apparatus 10 and maintain contact with the upper seal assembly 50 to keep a moisture, air, and dust tight seal.

Figure 7:
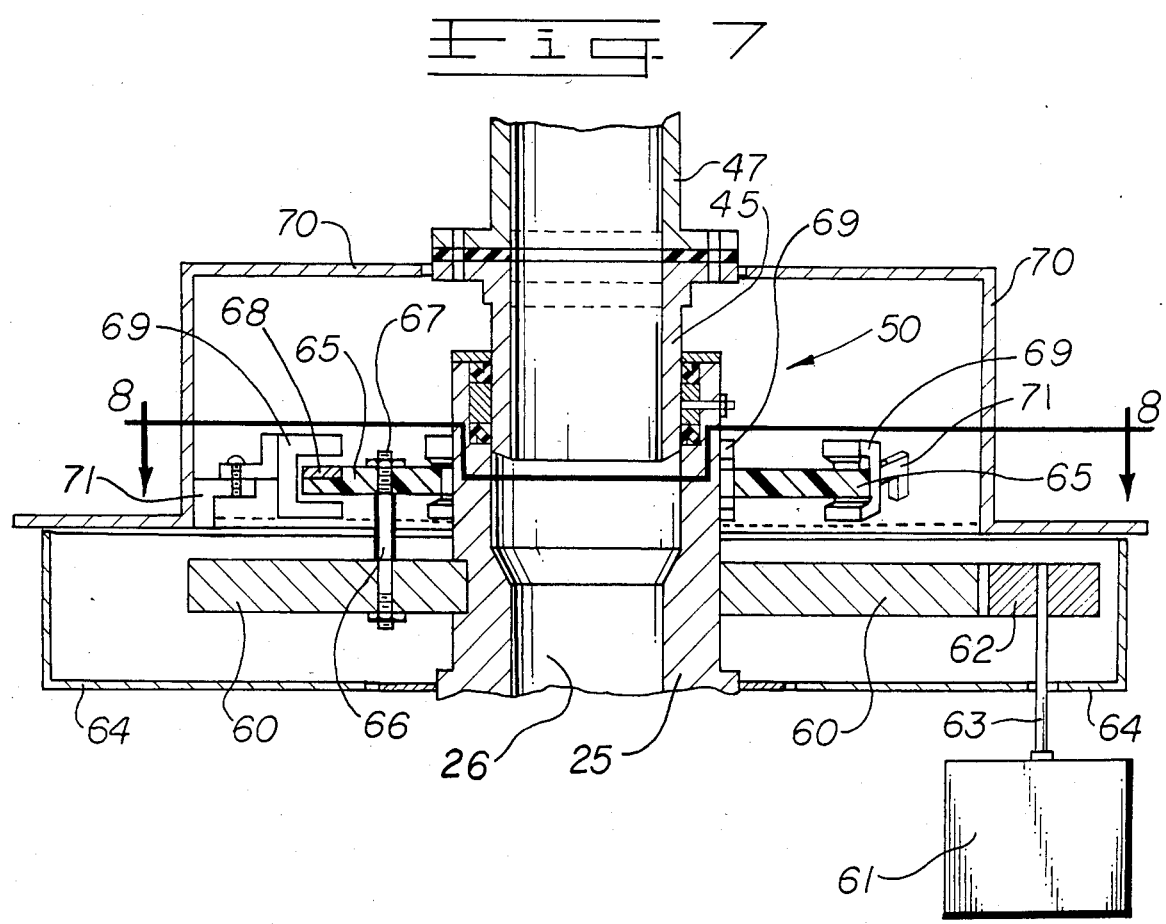
FIG. 7 is an enlarged detailed view, in section, of the upper portion of the distributing apparatus of the present invention.

It is preferred to rotate chute 24 by a drive means securely attached to the upper end 25 of chute 24. With reference to FIGS. 2 and 7, in this embodiment, the drive means is a ring gear 60 which is keyed to the upper end 25 of chute 24, preferably above the lower seal assembly 31, and rotatably fixed concentrically and exteriorily around the upper end 25 of chute 24 in a driven relation with a motor 61 operatively mounted adjacent said upper end 25 of chute 24 through a drive pinion 62 mounted on the power shaft 63 of the motor 61. The drive gear 60 is enclosed in a drive gear housing 64 with enough space to allow the drive gear 60 to rotate freely. The gear housing 64 provides a guard for the gear movement and is not necessarily moisture sealed but can be if desired.

Referring to FIGS. 7 and 8, a concentric disc 65 is positioned concentrically and exteriorily around the upper end 25 of chute 24, preferably above the drive gear 60, for rotation therewith. In this embodiment, a plurality of spacers 66 with bolts 67 therethrough connects or attaches the disc 65 to the drive gear 60 for rotation therewith. Bolted or otherwise securely fastened to the disc 65 is an element 68, herein referred to as flag 68, of magnetic material such as steel for engaging a vane switch 69, herein referred to as a limit switch 69. The flag 68 engages the limit switch 69 which is bolted or otherwise securely fastened at 71 to the interior of the limit switch housing 70. The limit switch housing 70 is bolted or otherwise securely attached to the gear housing 64. A plurality of limit switches 69, corresponding to the number of downspouts 13 used, may be employed. By electrically engaging and disengaging a selected limit switch 69 and flag 68 as the chute 24 rotates, the chute 24 may be selectively positioned over a selected downspout 13. Rotation of the distributing chute 24 and positioning the chute 24 over a downspout 13 may be done by known remote control means.

In operating the present distributing apparatus the distribution chute 24 is first selectively rotated to a position above any one of the downspouts 13 and locked into position utilizing the limit switch 69 and flag 68 described above. Next, a free flowing material is supplied from a supply source by any known means to the inlet tube 45 and passed through the distribution chute 24 to a discharge opening 14 of a selected downspout 13. The material is then ultimately distributed to a bin, pipe, tank or the like. By "free flowing material" is meant any material of any size or shape, solid or liquid, which is suitable for passing through the inlet tube 45, chute 24 and discharge openings 14 of the distributing apparatus 10. Free flowing material also includes slurries of any material.

By way of illustration only and not to be limited thereby, the free flowing material can be, for example, a hygroscopic solid granular material such as calcium chloride pellets with an average particle size of three millimeters. The calcium chloride pellets may be supplied to the hopper 47 of apparatus 10 by any known conveyor means which should also be air, moisture and dust sealed, such as a housed drag chain conveyor. The material passes through the inlet tube 45, chute 24, and the discharge opening 14 of a selected downspout, for example, through gravitational force. The flow is thus diverted or distributed to a selected bin or the like connected to the downspout. Once a bin or the like is filled or the desired flow amount is passed to the bin or the like, the distribution chute 24 is advanced to the next desired downspout.

The chute 24 can be advanced sequentially from one downspout in one direction, i.e., clockwise, to the next adjacent downspout until any number of the plurality of downspouts have been used. Alternatively, the chute 24 can be advanced sequentially in the opposite direction, i.e., counterclockwise, until any number of the plurality of downspouts have been used.

Still another method of advancing the distributing chute is to rotate the chute 24 systematically or randomly, in either a clockwise or counterclockwise direction, to any number of desired downspouts. As long as flow is desired, the operation can be continuous from one downspout to another. There is no problem with accumulation of dust particles on ledges or horizontal parts within the distribution chamber 23 of the apparatus because the apparatus does not contain any ledges, internal flat areas, or the like within the distribution chamber 23 where dust can settle. Any dust created in the distribution chamber 23 continues with the material flow because of the angle of the side walls of the apparatus 10 is greater than the angle of repose of the material being distributed. In addition, the cone 15 at the center prevents any dust buildup in the distribution chamber 23 of apparatus 10. Thus, an unrestricted flow of material is provided throughout the system.

The type of materials used in constructing the apparatus of the present invention can be any material which is inert to the material being distributed. Preferably, the parts of the apparatus in contact with the material flow should be nonreactive, abrasive resistant and corrosion resistant. Any metal or metal alloy such as stainless steel or inconel suitable for this purpose can be used. Alternatively, the surfaces in contact with the material flow can be coated with an inert, abrasive resistant, and corrosion resistant material, such as polytetrafluoroethylene to prevent reaction, wear or corrosion of the equipment. The materials of construction of the apparatus should be able to withstand some pressure build up in the chamber. The pressure of the apparatus is preferably atmospheric pressure or above to prevent any moisture in the surrounding atmosphere from leaking into the distribution chamber 23. Any excess internal air in the chamber may be vented out and displaced, for example, through the pipe 89 shown in FIGS. 9 and 10.

Figure 10:
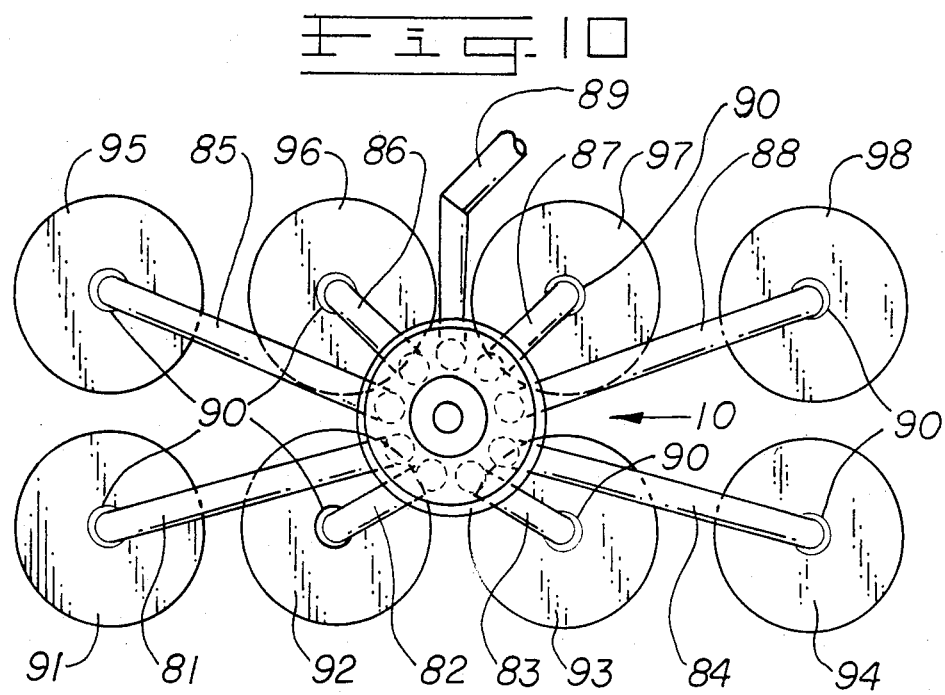
FIG. 10 is a top view of the distributing apparatus illustrated in FIG. 9.

FIGS. 9 and 10 illustrate the distributing apparatus 10 connected, for example, to pipes 81-89 at the flanges 17. The pipes may be connected, for example, to storage bins 91-98 by bolting means at the flanges 90. Pipe 89 is optionally attached to a use point.

It will be apparent to those skilled in the art that modification to the above apparatus can be made without departing from the scope of this invention. The invention as described by the appended claims is intended to cover such modifications.

What is claimed is:

1. An apparatus for distributing material flow comprising:

(a) a housing having an upper receiving section and a lower discharge section integral therewith,
said lower housing discharge section being defined by a plurality of fixed spouts arranged in a generally circular fashion at a radius around a central vertical axis, the spouts contacting each other at a portion of their upper end to form a cone with a common apex terminating inside the receiving section at the central axis, (b) a chute having a receiving end and a discharge end, said chute being rotatably and axially mounted to the upper housing receiving section such that at least a portion of the chute with the chute receiving end is postioned outside the housing and at least a portion of the chute with chute discharge end positioned outside the housing containing an annular rib portion adapted for supporting the chute on the housing receiving section, said chute extending from the outside of the housing to the inside of the housing through the housing receiving section such that the discharge end of the chute terminates inside the housing discharge section at a point below the common apex of the spouts, (c) at least a first seal assembly contacting the annular rib portion of the chute and adapted for sealing the inside of the housing from the surrounding environment, said first seal assembly comprising a first and second seal means, a lubrication means and a bushing means, and (d) a drive means engaging the portion of the chute outside the housing adapted to rotate the chute such that the discharge end of the chute moves in a pattern around the common apex and over the spouts such that material passed into the chute is discharged into at least one spout.

2. The apparatus of claim 1 wherein the drive means for rotating the chute defined by a ring gear fixed concentrically and exteriorly around the upper end of the chute in driving relation with a motor operatively mounted adjacent said upper end through a pinion mounted on the power shaft of a motor.

3. The apparatus of claim 1 wherein the inside of the housing is sealed from the atmosphere.

4. The apparatus of claim 3 wherein the first and second seal means are grease lip seals.

5. The apparatus of claim 1 wherein the shape of the upper housing receiving section is selected from pyrimidal, cylindrical or conical.

6. The apparatus of claim 5 wherein the shape of the upper housing receiving section is frustoconical.

7. The apparatus of claim 1 wherein said lower housing discharge section contains substantially non-planar surfaces with an angle of respose sufficient to substantially prevent settling of material thereon.

8. The apparatus of claim 1 wherein the chute is adapted for continuous material flow as the chute rotates around the common apex and over the spouts.

9. The apparatus of claim 1 including a sleeve telescoped within the receiving end of the chute.

10. The apparatus of claim 9 including a second seal assembly contacting the sleeve and adapted for sealing the receiving end of the chute from the surrounding environment, said second seal assembly comprising at least two seal members, lubrication means and bushing means.

* * * * *

UNITED STATES PATENT AND TRADEMARK OFFICE
CERTIFICATE OF CORRECTION

PATENT NO. : 4,623,056

DATED : November 18, 1986

INVENTOR(S) : Ronald R. Flaugher

It is certified that error appears in the above-identified patent and that said Letters Patent is hereby corrected as shown below:

Column 7, line 10, after "tioned" insert --inside the housing, said portion of the chute positioned--.

Signed and Sealed this

Eighteenth Day of July, 1989

Attest:

DONALD J. QUIGG

Attesting Officer

Commissioner of Patents and Trademarks